United States Patent [19]
Burnett

[11] 3,747,711
[45] July 24, 1973

[54] DISC BRAKE WITH AUTOMATIC ADJUSTER MECHANISM
[75] Inventor: Richard T. Burnett, South Bend, Ind.
[73] Assignee: The Bendix Corporation, South Bend, Ind.
[22] Filed: June 25, 1971
[21] Appl. No.: 156,646

[52] U.S. Cl............................ 188/71.9, 188/196 BA
[51] Int. Cl............................................. F16d 65/56
[58] Field of Search.............. 188/71.8, 71.9, 106 F, 188/196 F, 196 BA

[56] References Cited
UNITED STATES PATENTS
3,211,263 10/1965 Harrison........................ 188/71.9 X
3,590,964 7/1971 Krause............................ 188/196 F Primary Examiner—Duane A. Reger
Attorney—Ken C. Decker

[57] ABSTRACT
An automatic adjuster mechanism for a mechanically actuated disc brake is disclosed. The brake includes the usual caliper housing defining a bore therewithin and a piston slidably mounted in the bore. The caliper is operatively connected to a pair of friction elements, and is adapted to urge the latter into braking engagement with a rotor when the brake is actuated. An adjusting screw is threadedly connected to the piston, so that upon relative rotation between the screw and the piston the screw will extend from the piston. The mechanical actuator includes a cam plate which is rotatable from a first or brake released position to a second or brake applied position. As the cam plate is rotated from the first position to the second position, force transmitting means urge the latter axially within the bore so that the cam plate urges the adjuster screw, and therefore the piston, in a brake applying direction. A one-way clutch spring is carried in the screw and is also operatively connected to the cam plate. When the cam plate is rotated in the brake applying direction in excess of a predetermined amount, the spring turns relative to the screw. However, when the cam plate is rotated in the brake release direction, the spring grippingly engages the screw so that the latter turns with the cam plate after the predetermined amount of lost motion has occurred. As the screw turns, it extends from the piston, thereby effecting adjustment of the brake.

9 Claims, 2 Drawing Figures

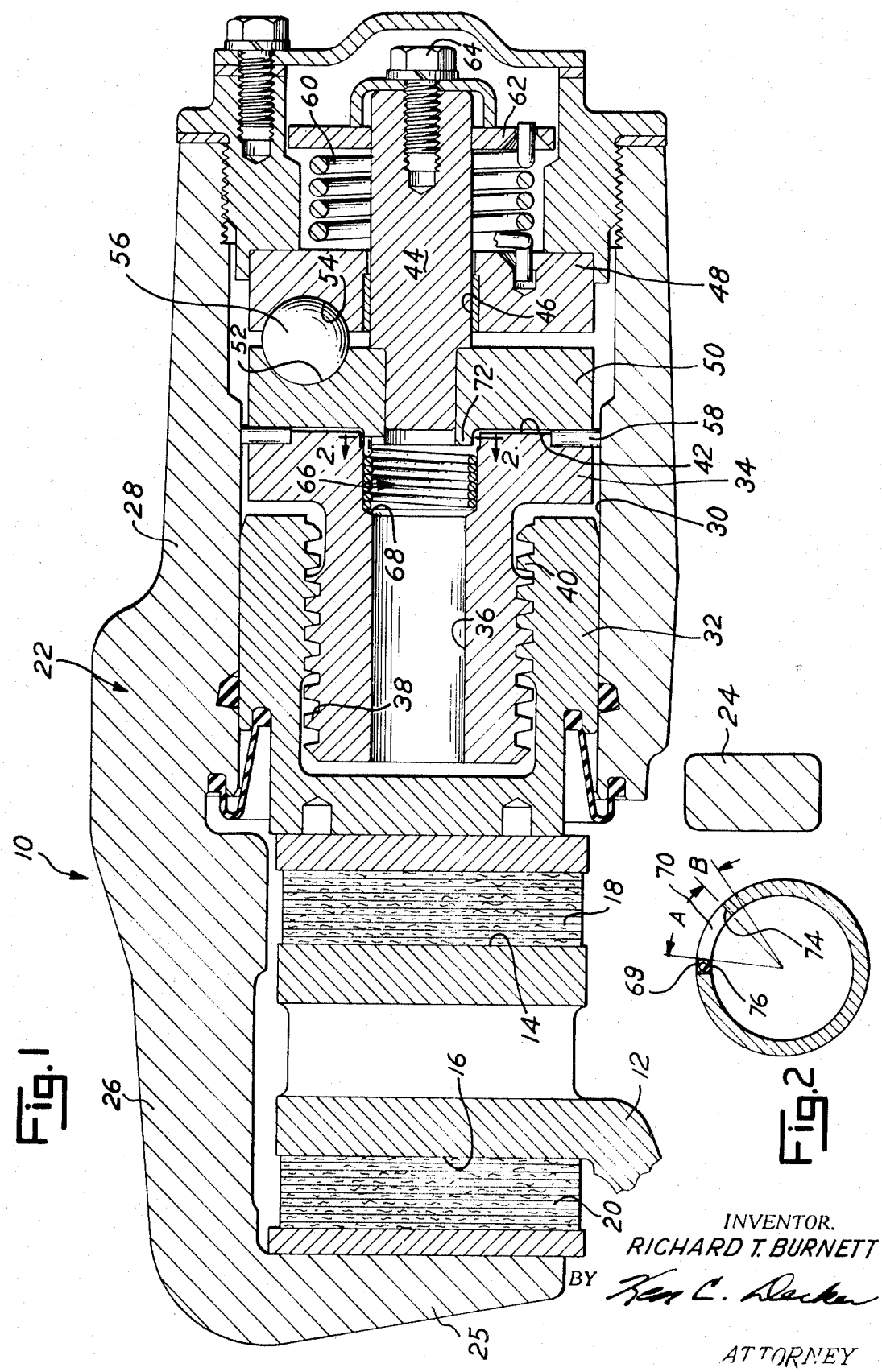
INVENTOR.
RICHARD T. BURNETT

DISC BRAKE WITH AUTOMATIC ADJUSTER MECHANISM

BACKGROUND OF THE INVENTION

This invention relates to an automatic adjuster for a mechanically actuated disc brake.

Fluid actuated disc brakes have become increasingly popular for use on passenger cars within the past few years. While disc brakes possess many advantages over the drum brakes known in the prior art, they have not been widely used on commercial vehicles. For the most part, disc brakes have not been accepted by users of heavy commercial vehicles, partly because prior art disc brakes have been almost exclusively actuated by hydraulic pressure. On the other hand, most large commercial vehicles are provided with an air brake actuating system. Therefore, it is desirable to provide a disc brake which may be actuated by air pressure. Such a brake is disclosed in copending U.S. Pat. application Ser. Nos. BRS-71-4& 68-A, owned by the assignee of the present invention and incorporated herein by reference. This application discloses a disc brake which includes a mechanical actuator, and an external air chamber for actuating the mechanical actuator when a brake application is effected. Since most mechanical actuators for disc brakes have a very limited applying stroke, it is imperative that an automatic adjuster be provided to maintain a proper clearance between the friction elements of the brake and the friction faces of the rotor.

SUMMARY OF THE INVENTION

Therefore, an important object of my invention is to provide an automatic adjuster for a mechanically actuated disc brake.

Another important object of my invention is to provide a simple automatic adjuster for a disc brake, thereby permitting its manufacture at a minimum cost.

BRIEF DESCRIPTION OF THE DRAWINGS

FIG. 1 is a cross sectional view of a disc brake made pursuant to the teachings of my present invention; and FIG. 2 is a cross sectional view taken substantially along lines 2—2 of FIG. 1.

DETAILED DESCRIPTION

Referring now to the drawing, the disc brake generally indicated by the numeral 10 includes a rotor 12 having a pair of opposed friction faces 14 and 16. A pair of friction elements 18, 20 are disposed adjacent the friction faces 14 and 16, respectively, and are adapted to frictionally engage the latter when a brake application is effected. A caliper generally indicated by the numeral 22 is slidably mounted on a torque member 24 in a manner well known to those skilled in the art, such as in the manner disclosed in my U.S. Pat. No. 3,388,774, owned by the assignee of the present invention and incorporated herein by reference. The caliper 22 includes an inwardly extending portion 25 which is disposed adjacent the friction element 20, a bridge portion 26 which straddles the periphery of the rotor 12 and a housing 28 defining a bore 30 therewithin which is disposed adjacent friction element 18.

An annular piston 32 is slidably mounted within the bore 30 and is adapted to urge the friction elements 18, 20 into engagement with their corresponding friction faces 14, 16 in a manner well known to those skilled in the art. An annular adjuster screw 34 is carried by the piston 32 and defines a bore 36 therewithin. Threads 38 are provided on the outer circumferential surface of the screw 34 and are adapted to engage corresponding threads 40 which are provided around the inner circumferential surface of the piston 32. As will readily be appreciated by those skilled in the art, upon relative rotation between screw 34 and the piston 32 in one direction, the screw 34 will extend from the piston 32, thereby increasing the distance between the end 42 of the screw 34 and the friction element 18. Therefore, the screw 34 and the piston 32 define an extendible member within the bore 30.

A shaft 44 is rotatably carried in an opening 46 which is provided within a partition member 48 mounted within the bore 30. The shaft 44 is also slidable with respect to the partition member 48 along the axis of the bore 30. A cam plate 50 is secured to the shaft 44 for movement therewith. Oppositely facing recesses 52, 54 are provided in the cam plate 50 and in the partition member 48, respectively. The recesses 52, 54 cooperate with one another to define a cavity which receives a spherical force transmitting element 56. When the cam plate 50 is rotated relative to the partition 48, the force transmitting elements 56 are urged up the sides of the recesses 52, 54 to drive the cam plate 50 to the left viewing FIG. 1. Details of the recesses 52, 54 and of the spherical force transmitting element 56 are more completely disclosed in the aforementioned U.S. Pat. application Ser. Nos. BRS-71-4 & 68-A. Although only one set of recesses 52, 54 are illustrated in FIG. 1, it will be readily appreciated by those skilled in the art that an appropriate number of spaced recesses 52, 54 and force transmitting elements 56 are distributed circumferentially around the members 50 and 48. For example, in the aforementioned U.S. Pat. application Ser. Nos. BRS-71-4 & 68-A, three such sets of recesses and force transmitting elements are disclosed. A bearing 58 is disposed between the cam plate 50 and the screw 34 to permit rotation of the cam plate 50 with respect to the screw.

One end of a torsional spring 60 is secured to the partition member 48, and the other end of the spring 60 is engaged with a plate 62 which is secured to the shaft 44 by a bolt 64. A lever (not shown) is rigidly secured to the cam plate 50 for rotating the latter. As the latter is rotated, the spring 60 is torqued, and therefore exerts a restoring force on the shaft 44 and upon the cam plate 50 yieldably urging the latter toward the position illustrated in FIG. 1 when the force applied to the aforementioned lever (not shown) is released. As stated hereinabove, any well known mechanism may be used to rotate the cam plate 50, such as an air actuator or cable as disclosed in the aforementioned U.S. Pat. Application Ser. Nos. BRS-71-4 & 68-A. The spring 60 also acts as a compression spring yieldably urging the cam plate 50 to the right viewing FIG. 1, thereby maintaining the spherical force transmitting elements 56 in their recesses 52, 54.

An automatic adjuster mechanism is provided which includes a spring generally indicated by the numeral 66 which is confined within the bore 36 between a shoulder 68 and the end of the bore 36 facing the cam plate 50. A tab 68 projects axially from the coil of the spring 66 adjacent the end of the bore 36 and engages a circumferentially extending slot 70 in an axially projecting portion 72 of the cam plate 50.

MODE OF OPERATION

When a brake application is effected, the cam plate 50 is rotated relative to the partition member 48, thereby driving the spheres 56 up the walls of the recesses 52 and 54 as more completely described in the aforementioned U.S. Pat. application Ser. Nos. BRS-71-4 & 68-A. Therefore, the cam plate 50 is moved axially with respect to the partition member 48. Since the left hand face of the plate 50 engages the screw 34, movement of the cam plate 50 will also urge the screw 34, and therefore the piston 32, to the left viewing FIG. 1. The friction element 18 is thereby driven into frictional engagement with its corresponding friction face 14. Since the caliper 22 is slidably mounted on the torque member 24, reaction forces will be transmitted through the bridge portion 26 and inwardly extending portion 25 of the caliper 22 to also urge the friction element 20 into engagement with its corresponding friction face 16, thereby effecting a brake application. When the force applied to the cam plate 50 is released, the torsion spring 60 rotates the shaft 44 relative to the partition member 48 to again align the recesses 52 and 54, permitting the spring 60 to drive the plate 50 to the right viewing FIG. 1 to release the brake.

If the angular displacement of the cam plate 50 required to effect a brake application is less than the angle A illustrated in FIG. 2, the brake does not require adjustment and the spring 66 is unaffected. However, if the total amount of angular movement of the cam plate 50 required to effect a brake application is greater than the angle A, the end 74 of the slot 70 will engage the tab 68 extending from the clutch spring 66. Since the friction element will already by partially engaged with the friction face 14 when this occurs, relatively high reaction forces will act through the piston 32 and will be transmitted through the threads 38 and 40 to the screw 34, thereby partially locking the threads 38, 40 to prevent relative rotation between the screw and piston. As the cam plate 50 continues to move past the angle A, the spring 66 is rotated relative to the screw. Assuming that the total angular movement required of the cam plate 50 is equal to the angle A plus the angle B illustrated in FIG. 2, the spring 66 will be rotated through the angle B only.

When the brake is released, the cam plate 50 initially moves relative to the tab 68 an amount equal to the angle A. After this occurs, the tab 68 engages the opposite end 76 of the slot 70. Since this happens near the end of the release stroke of the cam plate 50, the friction elements will already have been moved away from their corresponding friction faces 14 and 16, and therefore the reaction forces transmitted to the nut 34 through the piston 32 and the threads 38 and 40 will be relatively low. Further rotation of the cam plate 50 toward the brake release position will rotate the spring and, due to the frictional engagement of the outer circumferential surface of the spring with the wall or bore 36, will also rotate the screw 34, thereby extending the latter from the piston 32 to effect adjustment of the brake. Since the cam plate 50 must rotate through an angle A plus B, the screw 34 will be rotated through an angle equal to the angle B illustrated in FIG. 2. It should be noted that when the spring is rotated in this manner, the outer diameter of the spring "grows" a small amount to insure proper frictional engagement between the spring 66 and the screw 34.

I claim:
1. In a brake:
a rotor having a pair of friction faces;
a pair of friction elements, one of said elements being disposed adjacent each of said friction faces;
a torque member;
a caliper slidably mounted on said torque member and operably connected to each of said friction elements for urging the latter into braking engagement with their corresponding friction faces when a brake application is effected;
said caliper including a housing defining a bore therewithin;
actuating means within said bore for urging said friction elements toward their corresponding friction faces;
said actuating means including an extendible member slidable in said bore and operably connected to one of said friction elements, said extendible member having a pair of relatively rotatable elements, said member extending upon relative rotation between said elements, cam means rotatably mounted in said bore for sliding said extendible member upon rotation of said cam means, and clutch means between said cam means and one of said elements, said clutch means permitting relative rotation between the cam means and said one element when the brake is actuated, but joining said one element for rotation with the cam means after the latter rotates for a predetermined distance when the brake is released;
said cam means including a rotatable member mounted in said bore, said rotatable member being rotatable in a first direction to apply said brake and rotatable in the opposite direction when the brake is released;
said clutch means including resilient means disposed between said rotatable member and said one element, said resilient means moving relative to said one element when the rotatable member is rotated in said first direction, but locking said one element for rotation with said rotatable member when the latter is rotated in the opposite direction.

2. The invention of claim 1:
said rotatable member having a circumferentially extending slot; and
a tab extending from said resilient means engaging said slot, whereby said rotatable member may be rotated relative to said resilient means for a predetermined distance.

3. The invention of claim 2:
said resilient means being a coiled spring.

4. In a brake:
a rotor having a pair of friction faces;
a pair of friction elements, one of said elements being disposed adjacent each of said friction faces;
a torque member;
a caliper slidably mounted on said torque member and operably connected to each of said friction elements for urging the latter into braking engagement with their corresponding friction faces when a brake application is effected;
said caliper including a housing defining a bore therewithin;
actuating means within said bore for urging said friction elements toward their corresponding friction faces;

said actuating means including an extendible member slidable in said bore and operably connected to one of said friction elements, said extendible member having a pair of relatively rotatable elements, said member extending upon relative rotation between said elements, cam means rotatably mounted in said bore for sliding said extendible member upon rotation of said cam means, and clutch means between said cam means and one of said elements, said clutch means permitting relative rotation between the cam means and said one element when the brake is actuated, but joining said one element for rotation with the cam means after the latter rotates for a predetermined distance when the brake is released;

said cam means including a rotatable member mounted within said bore, said rotatable member being rotatable in a first direction to apply said brake and rotatable in the opposite direction when the brake is released;

said clutch means including resilient means carried by said one element and having a projecting tab engaging said rotatable member, said resilient means being adapted to rotate with said rotatable member, said resilient means slipping on said one element when said rotatable member is rotated in said first direction, but gripping said one element when the rotatable member is rotated in the opposite direction to rotate the one element with said rotatable member.

5. The invention of claim 4:

said rotatable member having a circumferentially extending slot;

said tab engaging said slot, whereby said rotatable member may be rotated relative to said resilient means for a predetermined distance.

6. The invention of claim 5:

said resilient means being a coiled spring.

7. The invention of claim 4:

said one element being an annular member defining a bore therewithin, one end of said bore facing said rotatable member;

said resilient means being a coiled spring confined within the end of said bore facing said rotatable member, the coils of said spring grippingly engaging the wall of said bore when said spring is rotated in said opposite direction with said rotatable member.

8. The invention of claim 7:

said rotatable member having a circumferentially extending slot;

said tab projecting from the coil of said spring adjacent said one end of the bore and engaging said slot, whereby said rotatable member may be rotated relative to said resilient means for a predetermined distance.

9. The invention of claim 7:

said other element being a piston slidable in said bore, said one element being threadedly engaged with said piston.

* * * * *